United States Patent [19]

Elia et al.

[11] Patent Number: 5,219,589
[45] Date of Patent: Jun. 15, 1993

[54] VENTED KNEADING PIN FOR EXTRUDER

[75] Inventors: Gerardo P. Elia, Akron, Ohio; Gaetan Arbour, Notre Dame de Lourdes-Joliette; Ivan Z. Podobnik, Barrie, both of Canada; Leonard R. Holm, Hartville, Ohio

[73] Assignee: Bridgestone/Firestone, Inc., Akron, Ohio

[21] Appl. No.: 823,934

[22] Filed: Jan. 22, 1992

[51] Int. Cl.$^5$ ............................................. B29C 47/76
[52] U.S. Cl. .................................. 425/203; 366/75; 366/90; 425/208
[58] Field of Search ................ 366/75, 80, 90, 324; 264/101, 102; 425/203, 208, 209, 812

[56] References Cited

U.S. PATENT DOCUMENTS

| | | |
|---|---|---|
| 1,184,016 | 5/1916 | Price . |
| 3,193,877 | 7/1965 | Edwards . |
| 3,253,818 | 5/1966 | Seddon et al. . |
| 3,367,635 | 2/1968 | Gresch . |
| 3,870,285 | 3/1975 | Bausch et al. ........................ 259/191 |
| 4,107,260 | 8/1978 | Dougherty ........................... 264/349 |
| 4,199,263 | 4/1980 | Menges et al. ......................... 366/90 |
| 4,538,917 | 9/1985 | Harms ................................. 366/75 |
| 4,581,992 | 4/1986 | Koch .................................. 366/90 |
| 4,657,499 | 4/1987 | Lewellen et al. .................... 425/208 |
| 4,723,901 | 2/1988 | Sarumaru ............................ 425/208 |
| 4,776,784 | 10/1988 | Batiuk .............................. 425/203 |
| 4,960,328 | 10/1990 | Schumacher et al. ................. 366/90 |

Primary Examiner—Scott Bushey
Attorney, Agent, or Firm—David A. Thomas

[57] ABSTRACT

An extruder for elastomeric material has an axial screw in an extruder chamber defined by a cylindrical housing. Two radial planes of vented kneading pins are provided upstream of the extruder housing succeeded by spaced-apart planes of non-vented kneading pins. Each vented kneading pin includes small apertures at the inlet end of the pin which communicate with a stepped bore of gradually increasing crosssectional area from the inlet to the outlet thereof whereby gases within the elastomeric material can be vented through the apertures communicating with the stepped bore to the exterior of the extruder housing.

6 Claims, 2 Drawing Sheets

5,219,589

VENTED KNEADING PIN FOR EXTRUDER

BACKGROUND OF THE INVENTION

1. Field of the Invention

The present invention relates to an apparatus for degasification of elastomeric material and the like in an extruder, particularly in an extruder utilizing a screw or worm.

2. Description of the Prior Art

When elastomeric material, such as a rubber compound, is fed into a hopper for a screw extruder, the material entrains and entraps air in the mixture. It is desirable to remove the air from the extrusion mass in order to avoid porosity in the rubber compound, especially if it is used for tire making. A typical extruder may also be provided with pins that project radially inwardly of the extrusion chamber for the purpose of kneading and mixing the material as it advances in the extruder chamber.

There have been several developments to date in an attempt to degasify elastomeric material. U.S. Pat. No. 4,538,917, issued Sep. 3, 1985 to Engelbert G. Harms, describes a screw extruder for elastomeric material having a degasification zone in which mixing pins are provided which have openings in the peripheral walls of the pins communicating with passages to vent the gases from the extrusion chamber.

U.S. Pat. No. 4,776,784, issued Oct. 11, 1988 to Martin Batiuk, describes an extruder for thermoplastic material in which a gas venting bore is arranged at an obtuse angle to the direction of flow and a screw is provided in the bore to be driven so as to continuously force the material back into the extrusion tube while allowing gas to escape.

Such prior art devices have disadvantages. For instance, the vented pins of Harms tend to clog up with rubber, preventing the air from exhausting. The Batiuk patent requires an expensive device with motors to drive each screw. Furthermore, the number of vents would be limited in view of the space requirement for each device. The vent device of Batiuk cannot serve the dual purpose of mixing.

SUMMARY OF THE INVENTION

It is an aim of the present invention to provide an improved extruder for elastomeric materials as well as thermoplastic materials with similar properties.

It is a further aim of the present invention to provide a vented pin for an extruder which allows air and other gases to escape while providing a kneading action to the material.

A construction in accordance with the present invention comprises, in a screw extruder for kneading and degassing an elastomeric material or the like having a cylindrical tubular housing defining an elongated extrusion chamber and a screw with lands thereon, at least a pin for kneading the material extending through the housing wall to extend radially within the extrusion chamber, and wherein the lands on the screw are interrupted in a radial plane coincident with the pin, the pin defining an axial bore open at the outlet to the exterior of the housing and communicating with an inlet port at the end of the pin closest to the screw, the inlet port having a cross-sectional area smaller than the smallest cross-sectional area of the bore, and the bore having progressively increasing cross-sectional areas towards the outlet such as to allow venting of gases from within the extruder to the exterior.

In a more specific embodiment, the bore is stepped in a series of circular cylindrical portions of ever increasing diameter from the inlet to the outlet.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
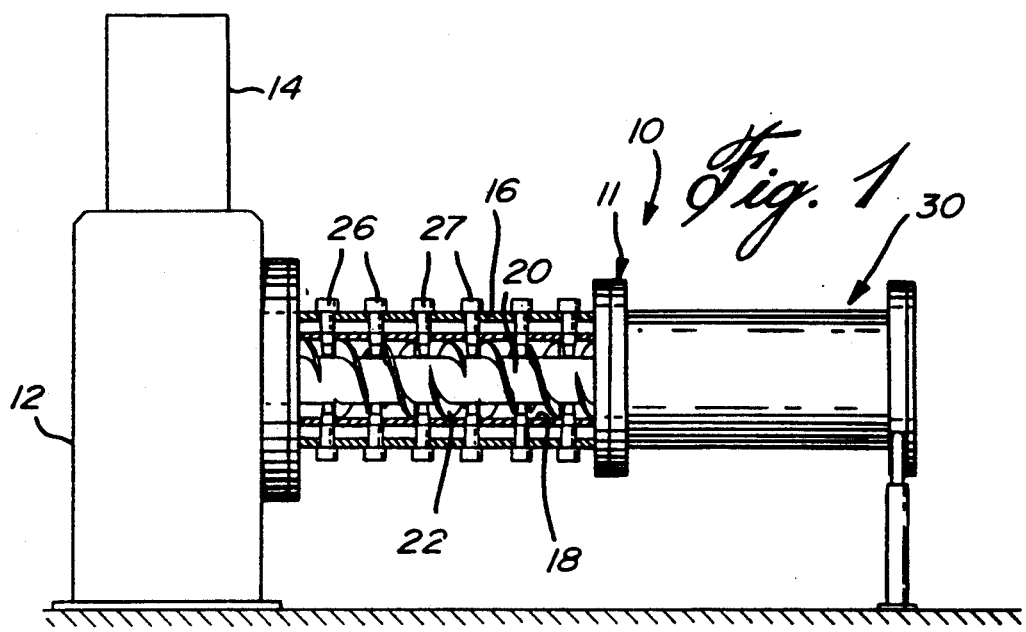
FIG. 1 is a side elevation, partly in cross-section, of an extruder in accordance with the present invention.
Figure 2:
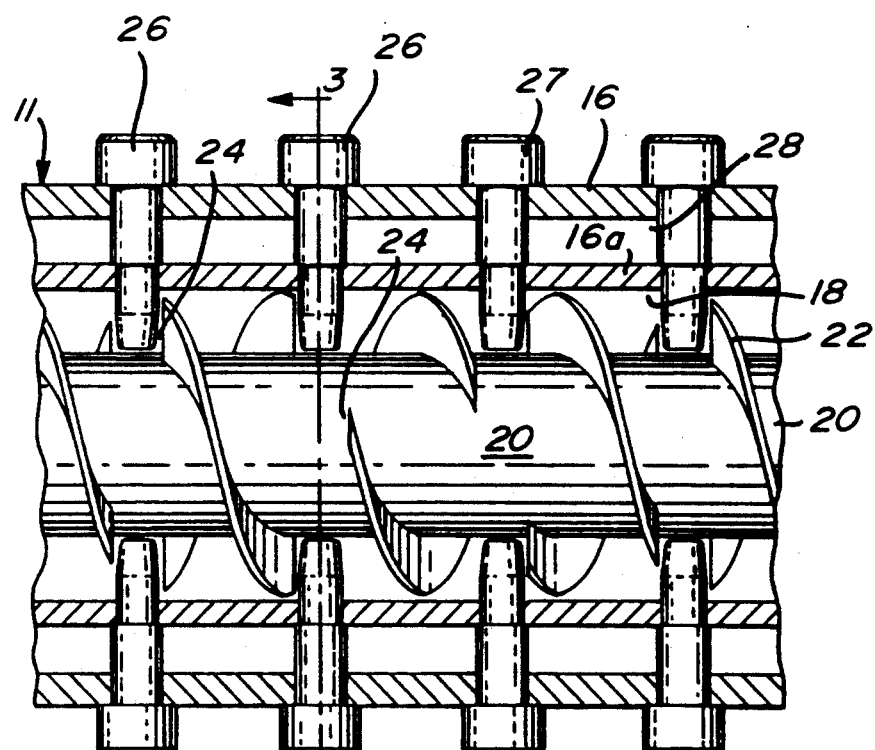
FIG. 2 is an enlarged fragmentary axial cross-section of a detail shown in FIG. 1.
Figure 3:
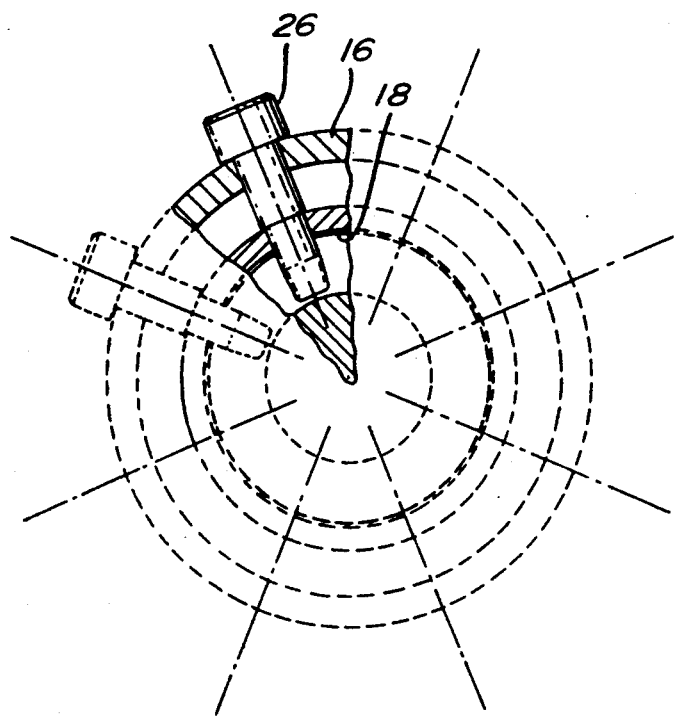
FIG. 3 is a fragmentary radial cross-section, taken along line 3—3 of FIG. 2; in accordance with the present invention.

Referring now to the drawings, there is shown an extruder 10 having a housing 11 with a hopper end 12, a hopper 14, and a cylindrical tube 16 extending from the hopper end. The cylindrical tube 16 defines an extrusion chamber 18 in which is located a screw 20. The screw 20 has lands 22 which are interrupted at gaps 24.

A degassing zone 30 of the extruder includes two planes of vented pins 26 and a series of succeeding spaced-apart planes of mixing pins 27. In an embodiment of the present invention, ten pins 26 or 27 are provided in each plane, and a total of eight spaced-apart, radial planes including the two planes of vented pins 26 are set out on the housing 11. It has also been discovered that better control of the heat will be maintained by reducing the number of mixing pins on the extruder 10. Thus, in the present embodiment, eighty mixing pins are provided, ten to a plane, and eight spaced-apart planes of pins are provided. The pins are located closer to the hopper end where heat buildup is required, and such pins are absent closer to the outlet end of the extruder where heat is more difficult to control.

The extruder housing 11 includes a water chamber or jacket 28 formed between the cylindrical wall 16 and an inner wall 16a. Either hot or cold water is passed through the jacket 28 depending on the portion of the extruder. The water jacket 28 would, of course, be separated into independent chambers allowing hot water, for instance, to be passed through at the degassing portion of the extruder near the hopper end 12 and cold water to be passed through the jacket 28 in the downstream end thereof to cool the elastomeric material passing therethrough.

It is important that the elastomeric material be maintained within a specific temperature range of between 210° and 236° F. at between 1000 and 10,000 p.s.i. If the temperature should increase beyond this range, the material will start to cure. The heat is generated in the extrusion chamber 18 by the shear effect produced by the screw 20 and the mixing pins 26 and 27. However, at the portion of the extrusion chamber nearest the hopper end 12, the temperature of the elastomeric material may not have reached this temperature range, and thus it is desirable to pass hot water through the water jacket. In the downstream end, of course, after heat is built up by way of the kneading pins 26, cooling water may be needed in the jacket 28.

Figure 4:
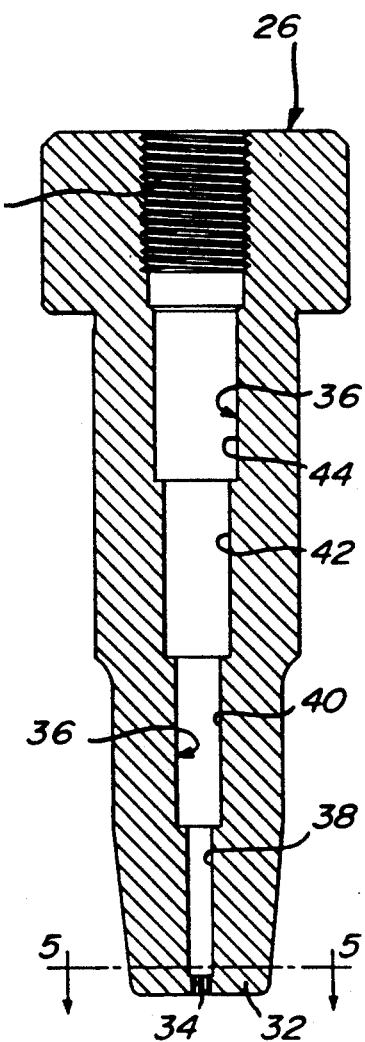

The pins 26, 27 are provided for kneading or mixing the material being extruded. The gaps 24 in the lands 22 are aligned with the planes of the mixing pins 26 and 27. The first two rows of kneading pins 26 are vented pins for the purpose of degassing the material as it advances. These vented pins 26 each include an inlet end 32, as shown in FIG. 4. A bore 36 communicates with ports 34 at the inlet end 32. In the present embodiment, the bore 36 is stepped such that there is a first bore section 38, a second bore section 40 of larger diameter than the bore section 38, a third bore section 42 of larger diameter than the bore section 40, and a fourth bore section 36 of larger diameter than the bore section 42. A final bore section 46 of yet greater diameter is provided which may be threaded as shown in FIG. 4.

In a specific example of a vented pin 26 in accordance with the present invention, the bore section 38 would have a diameter of 3.175 mm. or ⅛ inch. Bore section 40 has a diameter of 6.350 mm. or ¼ inch. As can be seen, the ratio of the diameters of bore section 40 to bore section 38 is 2:1. Bore section 42 has a diameter of 9.525 mm. or ⅜ inch. The bore section 44 can have a diameter of 12.70 mm. or ½ inch, and the section 46 has a diameter of 19.05 mm. or ¾ inch.

Figure 5:
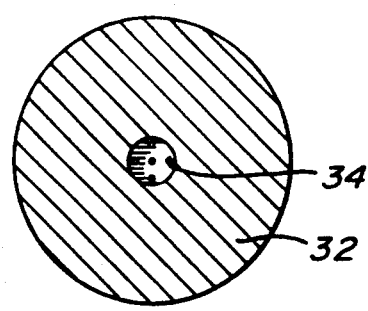
FIG. 5 is a radial cross-section, taken along line 5—5 of FIG. 4.

The ports 34, as shown in FIGS. 4 and 5, for instance, may be in the order of about 1 mm. diameter or 0.040 inch.

In the present application, the total length of each pin is 122 mm. with an outer diameter of 20 mm. at the inlet end 32 and of 29.95 mm. in the area of bore sections 42 and 44.

The purpose of the bore structure 36 of the vented pin 26 is to permit air and sometimes rubber compound to escape through ports 34. The diameter of the first bore 38 is determined by the expansion coefficient of the rubber compound, that is, after the rubber compound passing through the 1 mm. size port expands, there is enough room to allow the air to pass. Likewise, if the rubber can extend in the bore section 38 and enter bore section 40, the bore section is of greater diameter than bore section 38 and on. This stepped bore structure 36 reduces the possibility of the rubber or elastomeric material from clogging the ports 34. The rubber will act as spaghetti as it passes through the ports 34 and due to its high viscosity will sometimes stick to the walls of bores 38 and 40, for instance. However, because of the larger size of the bore sections, air will still be allowed to pass through. One of the problems with prior art vented pins having a constant diameter bore such as in U.S. Pat. No. 4,538,917 is that the bores clog up with the rubber material, preventing the air from passing through, particularly when there are several branch openings entering into a constant diameter bore as shown in this patent.

Furthermore, in the present invention, the ports 34 are provided in the end of the pin 26 parallel with the major axis of pin 26 rather than radially laterally directed through the side walls thereof.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. In a screw extruder for kneading and degassing an elastomeric material having a cylindrical tubular housing wall defining an elongated extrusion chamber and a screw with lands thereon, at least a pin for kneading the material extending through the housing wall to extend radially within the extrusion chamber, and the lands of the screw are interrupted in a radial plane coincident with the pin, wherein the pin defines an axial bore open at an outlet end to the exterior of the housing and communicating with at least an inlet port at the end of the pin closest to the screw, the inlet port having a cross-sectional area smaller than the smallest cross-sectional area of the bore, and the bore having progressively increasing cross-sectional areas from the inlet port to the outlet end such as to allow venting of gases from within the extruder to the exterior.

2. A pin as defined in claim 1, wherein the bore is stepped in a series of two or more stepped circular cylindrical portions of progressively-increasing diameter from the inlet port to the outlet of the pin and wherein the diameter of the first of the two or more cylindrical portions closest to the inlet port has a diameter greater than the diameter of the inlet port by a value greater than the resulting expansion of the elastomeric material passing through the inlet port whereby air is allowed to pass by the expanded elastomeric material in said first cylindrical portion.

3. A pin as defined in claim 2, wherein the second of the two or more cylindrical portions downstream from the inlet port has a diameter greater than the diameter of the first cylindrical portion by a value greater than the resulting expansion of the elastomeric material passing through the first cylindrical portion.

4. A pin as defined in claim 2 or 3, wherein the elastomeric material is a rubber component and the ratio of the increased diameter of the first two succeeding cylindrical portions from the inlet port is 2:1.

5. A vented pin as defined in claim 3, wherein the inlet port has a diameter of 1 mm. while the first cylindrical portion has a diameter of 3.175 mm. while the diameter of the second cylindrical portion is 6.35 mm.

6. An extruder as defined in claim 1, wherein the extruder includes a hopper connected to a feed end of the housing and the other end of the housing includes a discharge, and there are two planes of vented pins adjacent to but spaced apart from the hopper end and that further kneading pins are provided in spaced-apart planes downstream of the vented pins.

* * * * *